United States Patent
Ramiah

(10) Patent No.: US 8,001,174 B2
(45) Date of Patent: Aug. 16, 2011

(54) APPLICATION PROCESS IN COMMUNICATION SYSTEM USING CENTRAL PROCESSOR FOR FORWARDING REQUEST TO DESTINATION PROCESSOR BASED ON CONNECTION STATUS

(75) Inventor: Somasundaram Ramiah, Eden Prairie, MN (US)

(73) Assignee: Calamp Corp., Oxnard, CA (US)

( * ) Notice: Subject to any disclaimer, the term of this patent is extended or adjusted under 35 U.S.C. 154(b) by 148 days.

(21) Appl. No.: 12/336,215

(22) Filed: Dec. 16, 2008

(65) Prior Publication Data

US 2010/0070609 A1 Mar. 18, 2010

Related U.S. Application Data

(60) Provisional application No. 61/097,730, filed on Sep. 17, 2008.

(51) Int. Cl.
*G06F 15/16* (2006.01)
(52) U.S. Cl. .............. 709/201; 709/208; 712/36
(58) Field of Classification Search .......... 709/227, 709/229, 201, 217, 219, 218, 208; 455/414.1, 455/461; 718/1; 714/4; 726/12; 707/102; 370/351; 712/36
See application file for complete search history.

(56) References Cited

U.S. PATENT DOCUMENTS

| | | | |
|---|---|---|---|
| 4,694,396 A | 9/1987 | Weisshaar et al. | |
| 5,315,705 A | 5/1994 | Iwami et al. | |
| 5,546,584 A | 8/1996 | Lundin et al. | |
| 5,644,719 A | 7/1997 | Aridas et al. | |
| 5,790,809 A | 8/1998 | Holmes | |
| 6,330,689 B1 | 12/2001 | Jin et al. | |
| 6,377,808 B1 | 4/2002 | Korneluk et al. | |
| 6,901,594 B1 | 5/2005 | Cain et al. | |
| 2007/0026876 A1* | 2/2007 | Freilich | 455/461 |
| 2007/0123223 A1* | 5/2007 | Letourneau et al. | 455/414.1 |
| 2007/0136445 A1* | 6/2007 | Sweatt et al. | 709/219 |
| 2007/0233876 A1 | 10/2007 | Thompson | |
| 2008/0028040 A1* | 1/2008 | Tremblay et al. | 709/218 |
| 2008/0195645 A1* | 8/2008 | Lapstun et al. | 707/102 |
| 2008/0233927 A1* | 9/2008 | Moon et al. | 455/414.1 |
| 2008/0298342 A1* | 12/2008 | Appleton et al. | 370/351 |
| 2008/0313728 A1* | 12/2008 | Pandrangi et al. | 726/12 |
| 2009/0013210 A1* | 1/2009 | McIntosh et al. | 714/4 |
| 2009/0204964 A1* | 8/2009 | Foley et al. | 718/1 |

* cited by examiner

*Primary Examiner* — Le Luu
(74) *Attorney, Agent, or Firm* — Kauth, Pomeroy, Peck & Balley LLP

(57) ABSTRACT

An application process to process communication system is provided in which seamless communication between onboard processes and off-board processes are provided. The off-board processes are typically remote and/or mobile relative to the onboard processes in which a central process maintains communication between the processes.

16 Claims, 6 Drawing Sheets

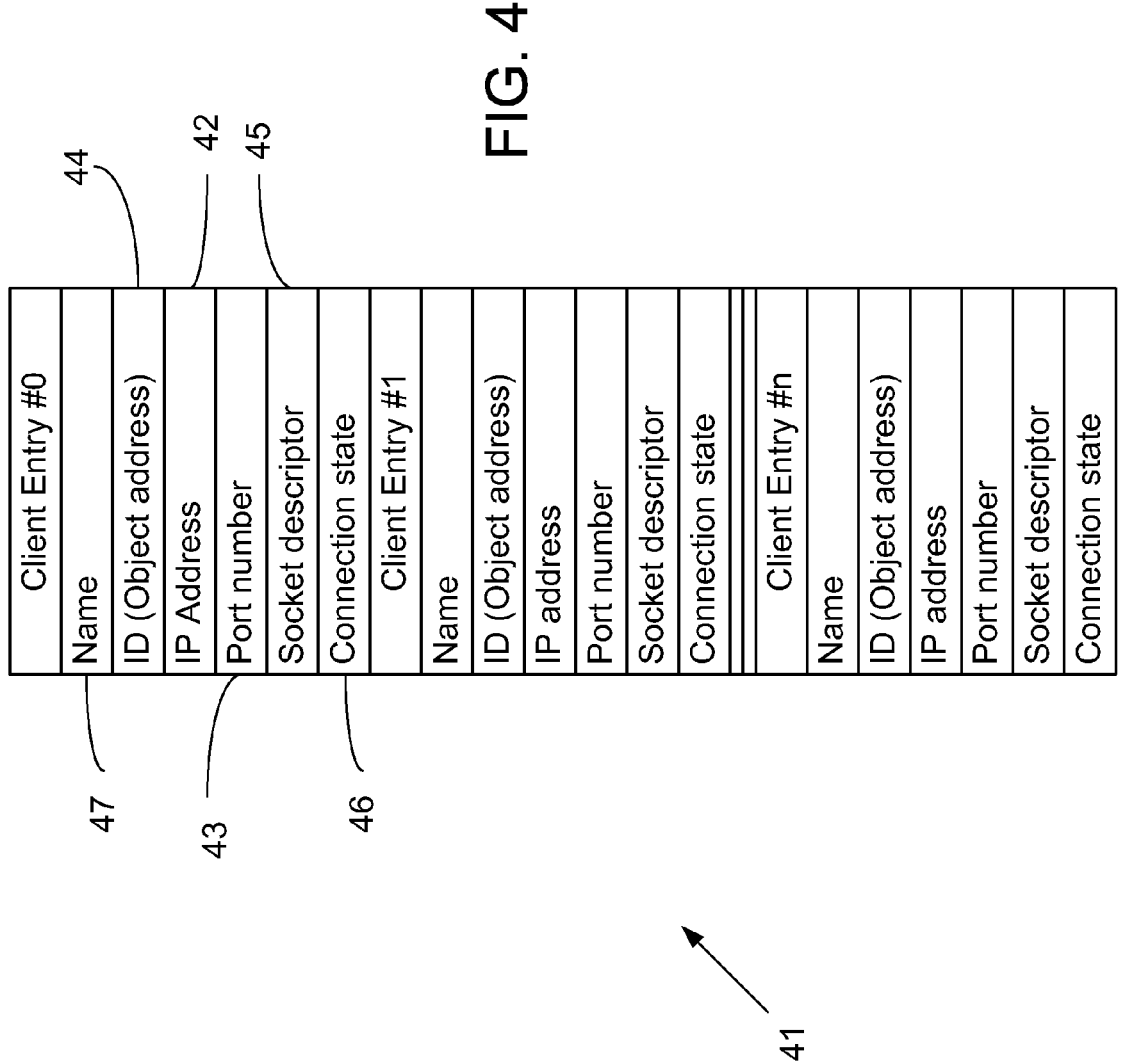

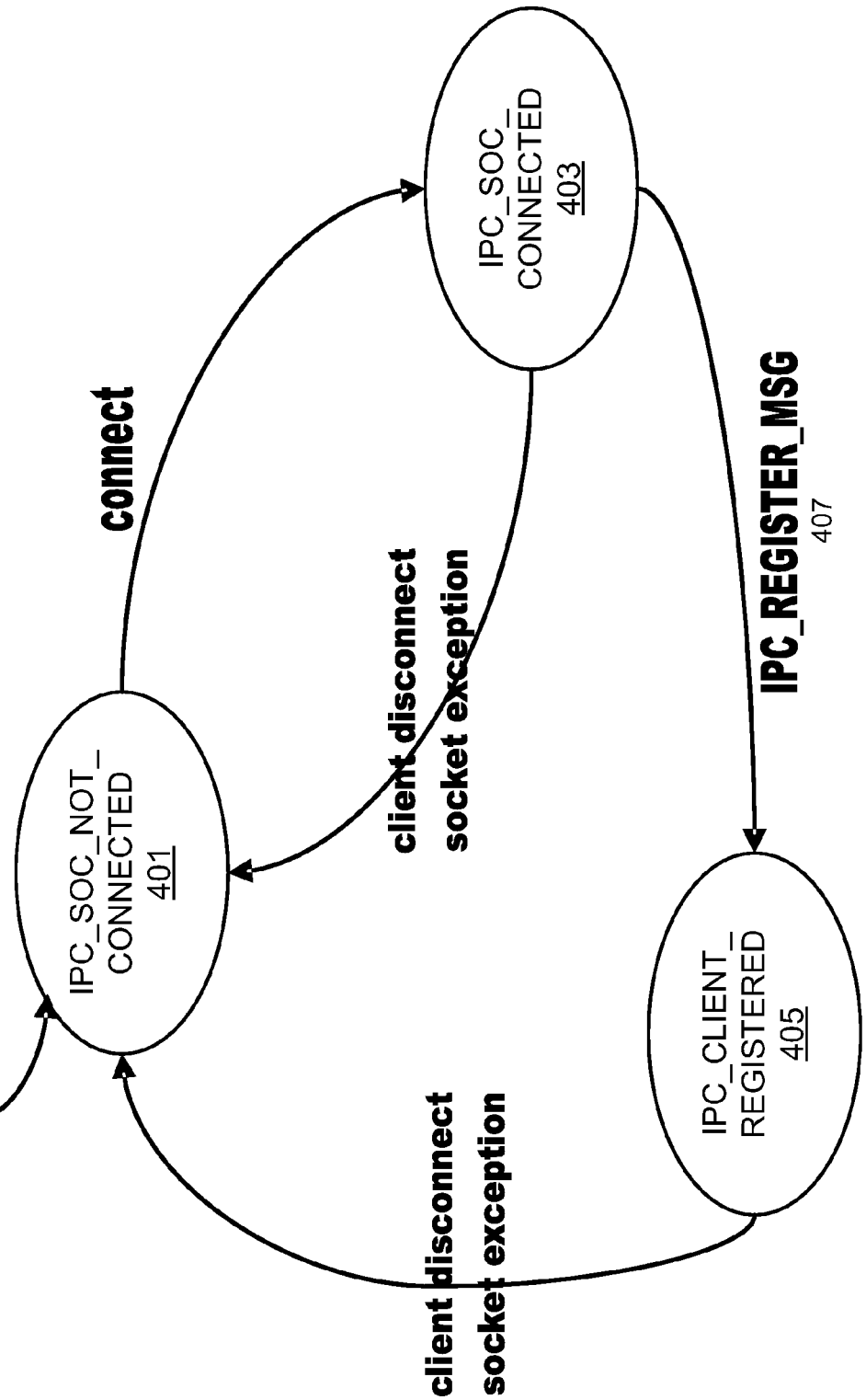

APPLICATION PROCESS IN COMMUNICATION SYSTEM USING CENTRAL PROCESSOR FOR FORWARDING REQUEST TO DESTINATION PROCESSOR BASED ON CONNECTION STATUS

CROSS REFERENCE TO RELATED APPLICATIONS

This application claims the benefit of U.S. Provisional Patent Application No. 61/097,730, filed Sep. 17, 2008, the entire disclosure of which is hereby incorporated by reference as if set in full herein.

BACKGROUND

The present invention generally relates to communication systems and in particular to application process to process communication systems.

In today's computing environment, multiple processes are operating on multiple computing devices. Often the exchange of information between each process and each computing device is required. However, these devices can use different processors, operating systems, and communication protocols that often limit or hinder the exchange of information. The increased desire for the computing devices to be mobile has further constrained this exchange of information. Thus, there is a need to overcome these obstacles and to further make the exchange of information seamless, scalable and simple.

SUMMARY

Generally, an application process to process communication system is provided in which seamless communication between processes between internodes and intranode occurs. Intranode is a node or processor in which a process is operating that corresponds to a central processor also known as onboard. Internodes are nodes or processors in which a process is operating that does not correspond to the central processor. The geographical location of internodes are typically distal and changing, e.g., a mobile processor within a GPS unit or cellphone.

In one embodiment, a method of communicating between application processes to processes in a communication system comprises initializing a process communication handler on a central processor; receiving a request from a remote processor in communication with and distal to the central processor; identifying a destination processor from the received request; identifying a connection status of the destination processor; and forwarding the received request to the identified destination based on the identified connection status.

In one embodiment, an application process to process communication system comprises an intranode processor, a first internode processor in communication with the intranode processor and a second internode processor. The second internode processor is in communication with the intranode processor and the first internode processor only through the intranode processor.

In one embodiment, an application process to process communication system comprises an intranode processor and an internode processor. The intranode processor has a plurality of application processes operating on the intranode processor and an internode processor is in communication with the intranode processor having a plurality of application processes operating on the intranode processor. The intranode processor tracks an application process of the plurality of application processes operating on the internode processor when an application process transmits a message to an application process on the internode processor.

Many of the attendant features of the present invention will be more readily appreciated as the same becomes better understood by reference to the foregoing and following description and considered in connection with the accompanying drawings in which like reference symbols designate like parts throughout.

BRIEF DESCRIPTION OF THE DRAWINGS

FIG. 4 is an exemplary routing table in accordance with various embodiments of the invention;

FIG. 5 is an exemplary state machine diagram in accordance with various embodiments of the invention.

DETAILED DESCRIPTION

A communication system is provided that includes a communication framework through which processes can communicate unrestricted by processors' location or type. The system includes a central processor and/or a communication handler that maintains connectivity between each process. The central process communication handler ensures that each message from each process is sent to the appropriate process. In particular, the communication framework facilitates data exchange between onboard processes and applications running on different machines regardless of whether the machines are Big Endian based or Little Endian based.

Figure 1:
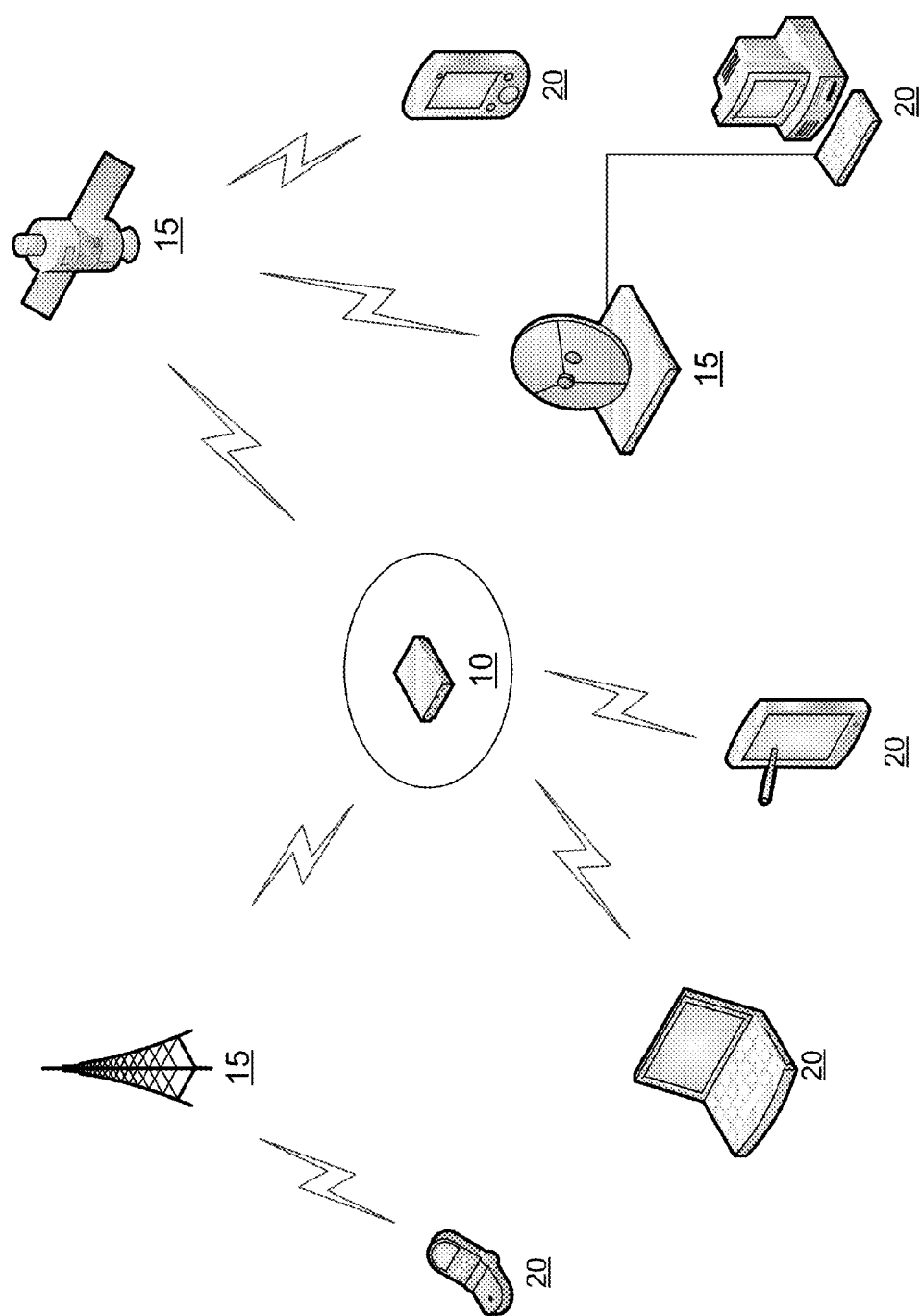
FIG. 1 is a block diagram of one embodiment of an internode and intra-node communication system.
Figure 2:
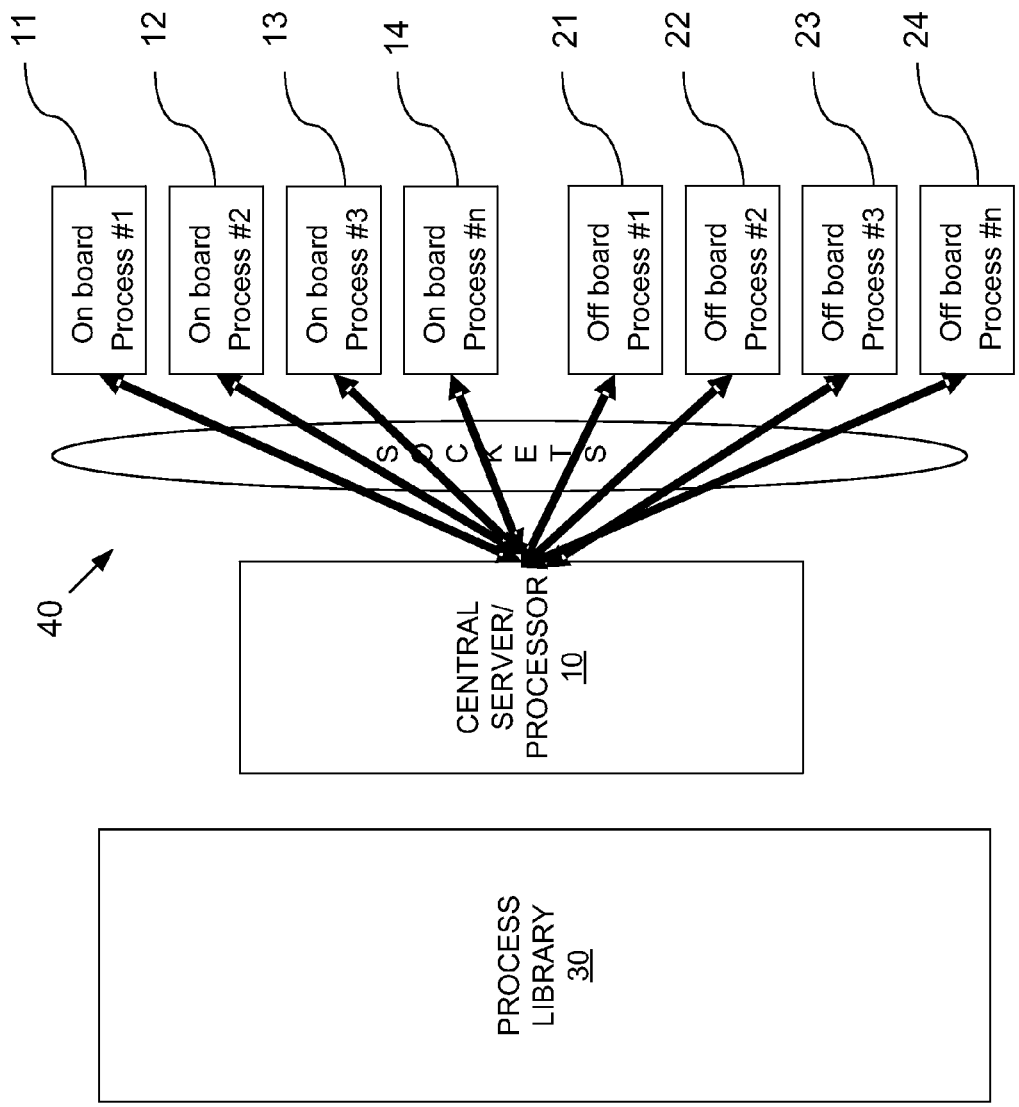
FIG. 2 is a block diagram of one embodiment of the communication system in accordance with various embodiments of the invention.

Referring to FIGS. 1-2, the system includes an intranode or central server or processor 10. The central server 10 depending on the application can be in communication with various internode processors or processing devices 20 through various communication mediums 15. Each process of each processor registers with and exchanges messages with the central server 10 to ensure complete connectivity and communication between each of the processes. As such, the central server ensures that each message transmitted from one process is sent to the appropriate process, e.g., on-board processes 11-14 or off-board process 21-24, by tracking each client connection. The number of processes and process locations (on-board, off-boards) can vary depending on the application and computing or communication environment.

In one embodiment, a central server process is started upon startup. The server opens up a central server socket through which all the client application processes can connect. The central server performs three functions but is not limited to three functions. First, it accepts the connections from the client applications requiring a process communication service. Second, it maintains a list of all active client connections. Third, it routes the messages based on the information present in the message, i.e., a message header.

The process communication library 30 contains reentrant methods for the client application to use while sending or receiving process messages. These library functions can be built into a shared library so all applications can make use of these functions. Macros are also defined to construct process messages. Examples of the functions and macros are described in greater detail below.

Message Header

Figure 3A:
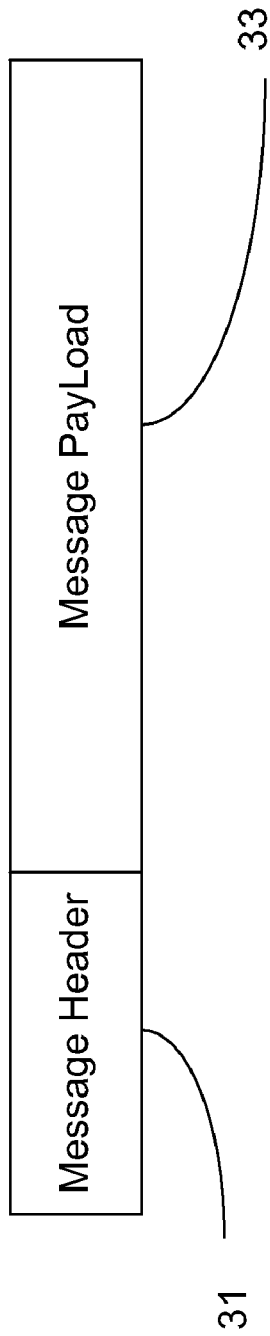
FIGS. 3A-B are exemplary message header and payload in accordance with various embodiments of the invention.
Figure 3B:
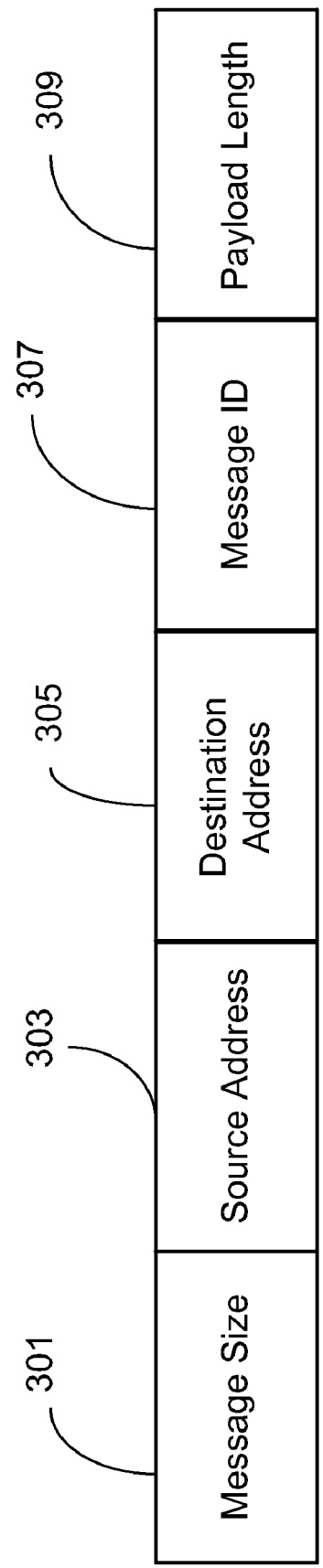

Referring now also to FIGS. 3A-3B, the process message includes a message header 31 and a message payload 33. In one embodiment, the message header includes message size 301, source object address 303, destination object address 305, and message identifier 307. The message size is the overall size of the process message in bytes. This includes the size of the message header and the message payload which is discussed in greater detail below. The source object address is a unique address of the application initiating the process message and the destination object address is a unique address of the client or destination application/processor the process message is destined for. In one embodiment, the source and/or destination object address is predefined. The message identification includes a unique identifier to identify the payload data and payload message length 309, the length of the payload in bytes. One skilled in the art would appreciate that the order and size of each portion of the message header are fixed to accommodate different messaging configurations.

All the fields in the message header are sent in the network byte order. This enables the process communication framework to handle messages from both onboard and the off-board applications. The message header is 32 bit aligned.

Message Payload

The message payload 33 contains the application message data which is exchanged between the application processes. The process communication framework ignores the byte ordering of the payload and thus it is the responsibility of the application to deal with the byte ordering of the payload to extract the appropriate message information. As far as the onboard applications are concerned, the byte ordering is irrelevant as they operate on the same machine or processor.

Client Registration

Upon system initialization the central server process is started automatically. Once the central server process is up and running, it is ready for use by any client applications. Every client process requiring the communication service registers with the central server. This is performed by sending a registration message, e.g., an IPC_REGISTER_MSG, to the central server. In one embodiment, this is done during the client process' initialization. The registration message in one embodiment contains the name of the application which is saved by the communication framework for debugging purposes. The client registration and connection operation is described in greater detail below.

Process Routing Table

The central server maintains a routing table for routing or transferring the process messages between various onboard processes as well as between various onboard and off-board processes. FIG. 4 illustrates one embodiment of a routing table 41. Every entry in the routing table contains, but is not limited to, client connection data. For example, the table includes a unique or IP address of a client connection and a client port number 43 used by the client connection. If the client is an onboard process, the IP address is the same as the IP address of the central server. Also included in the table is an object address 44 of the client which uniquely identifies the client and a socket descriptor 45 that is a socket handle which uniquely identifies the client connection. A name 47 of the client application in one embodiment is also included in the routing table.

The routing table has a record of the connection state 46, i.e., the state of the client connection. FIG. 5 provides a state diagram of the connection finite state machine operating on the central server. As such, the central server keeps track of the state of every client connection. There are three, but not limited to three, distinctive states. One state is labeled IPC_SOC_NOT_CONNECTED 401. This is the default state and indicates that the client is not connected with the central server. Another state is IPC_SOC_CONNECTED 402. This state indicates that the client socket connection has been established, but the client is not registered. The central server transitions the client to this state right after the server receives and accepts the connection from the client. In this state however the process messages destined for the client from other clients are still not routable to this client. The third state, IPC_CLIENT_REGISTERED 403, indicates that the client application is connected and registered. In the connected and registered state, process messages can be routed to the client by the central server. In one embodiment, client registration ensures that not only can the client connect to the central server but also the central server can receive and send messages to and from the registered client to be sent from or received by other registered clients.

In various embodiments, the central server, for example, through the routing table, records and/or tracks the name of the application, connect/disconnect times and/or hash keys or unique table identifiers. In one embodiment, the application name is used for debug purposes. When the client registers with the central server, the client sends its name to the central server in the IPC_REGISTER_MSG 405. The central server does not use this field for message routing. The connect time includes the date and time when the client connection was established and the disconnect time is the date and time of the last client disconnect. A hash or table key is used for identifying a client entry in the routing table.

The central server maintains a static routing table of a fixed size. However, one skilled in the art could easily appreciate that the table can be adapted to be a dynamically growing table with the order and size of each portion of the table varied to accommodate different and dynamic memory or processing configurations.

Process Message Routing

A client application in one embodiment constructs a process message using the macros and methods provided in the process communication library 30. Some exemplary functions follow include but are not limited to send message functions used by applications to construct and send a process message and receive message functions used by applications to receive the payload data and the size of the payload data from the message received.

Some exemplary macros include but are not limited to macros used by the applications, if desired, to extract various fields in the message header, e.g., message length, type, destination, source and size. It should be noted that the message length macro extracts the length of the entire message and message size macro extracts the size of the payload. Additional example macros include but are not limited to a macro used by applications to encode the message header fields in the network byte order and a macro used by applications to decode the message header fields.

As such, in one embodiment, the message header information is constructed in the network byte order using process communication macros. After the client application or processor finishes constructing the process message, the client application sends this message to the central server. The central server examines the header of the incoming process message to identify the destination client processor/application. If the destination is a registered client, the central server locates the routing table entry pertaining to the destination client and forwards the process message to the destination client using the information present in the destination client's routing table entry. If the destination client is not registered, the central server drops the process message. In one embodiment, the initiating client application handles the lost or dropped message by introducing an acknowledgement or return receipt message from the intended recipients. As such, the central server is not burdened or limited to waiting for a destination client that may or may not register with the central server. Likewise, the client application can decide its own time limit or recourse if an acknowledgement message is not received.

Figure 6:
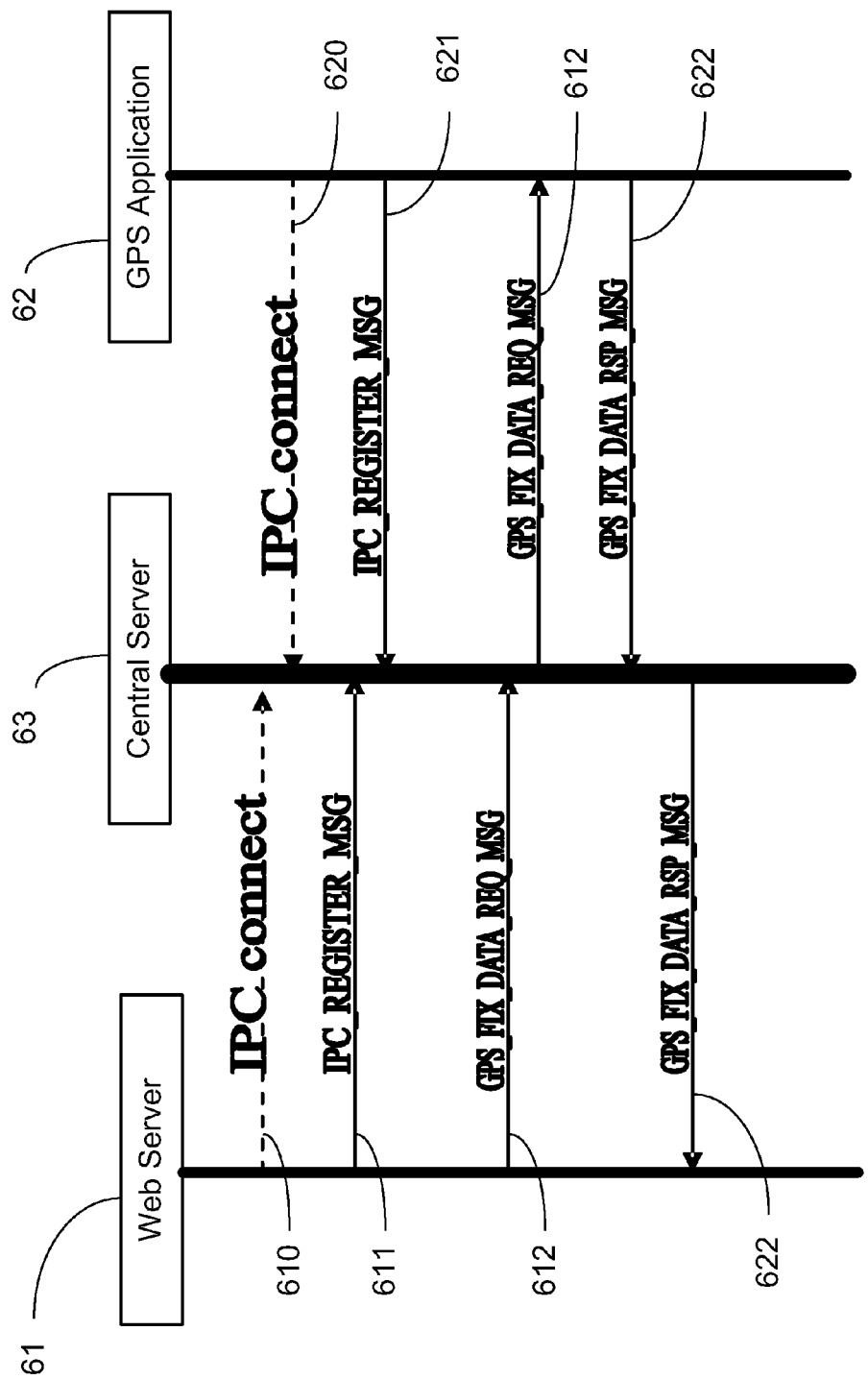
FIG. 6 is an exemplary messaging diagram in accordance with various embodiments of the invention

FIG. 6 illustrates one such message exchange between a web server 61 and a GPS application 62 on a remote or client processor. The web server in this case operates on a separate processor from that of the central server. In one embodiment, the web server and/or the GPS application operates on the central server. Upon startup, the web server 61 transmits a connection request, e.g., an IPC connect message 610, to a central processor or server 63. Similarly, the GPS application 62 transmits a connection request, e.g., an IPC connect message 620, to the central server. Subsequently, the web server 61 and the GPS application 62 transmit a registration message, e.g., IPC register message 611 and 621. The central server extracts the source and destination data from the connect request messages. The extracted information is stored in one or more routing tables as previously described. Upon receipt of a registration message, a connection status is updated, e.g., from idle to connected.

With both the web server and GPS application registered, the web server can exchange messages with the GPS application and vice versa. For example, the web server can transmit a data request, e.g., a GPS fix data request message 612, to the central server. Upon receipt of the message, the central server extracts the destination information from the data request. Comparing the extracted destination information to the routing table, the central sever determines if the connected is valid, e.g., the connected status of the destination is connected and registered. If valid, the central server forwards the data request, not altering the payload, to the GPS application. The reverse path is taken as the GPS application responds to the data request, e.g., GPS fix data response message 622. Such an exchange of message with the central server as the conduit continues as the processors or applications remain connected and registered and the central server remains in operation.

It should be appreciated that multiple processors or applications separate, mobile and/or remote from central server can communicate to each other via the central server provided that the associated processor or application connects and registers with the central server. In one application, the central server operates on a wireless mobile data modem. One such modem is manufactured by applicant, CalAmp, under the trademark CiPHR. In one embodiment, the central server utilizes the TCP/IP socket layer 40 on a UNIX type platform. One skilled in the art would appreciate that other similar types of communication transport layers and operating systems may be used.

Thus, an application process to process communication system is provided. Although the present invention has been described in certain specific aspects, many additional modifications and variations would be apparent to those skilled in the art. It is therefore to be understood that the present invention may be practiced otherwise than specifically described, including various changes in the size, shape and materials, without departing from the scope and spirit of the present invention. Thus, embodiments of the present invention should be considered in all respects as illustrative and not restrictive.

What is claimed is:

1. A method of communicating between application processes in a communication system, the method comprising:
   initializing a process communication handler on a central, processor;
   receiving a request from a remote processor in communication with and distal to the central processor, where the request
   includes a destination object address that is a unique address identifying a destination process;
   extracting the destination object address from the received request;
   identifying a connection status of the destination processor; and
   forwarding the received request to a process identified by the destination object address.

2. The method of claim 1 further comprising registering the remote processor with the central processor.

3. The method of claim 2 further comprising registering the destination processor with the central processor.

4. The method of claim 3 further comprising comparing the extracted destination object address to a routing table listing the connection status of one or more processors.

5. The method of claim 4 further comprising initializing an application process on the central processor and wherein the destination object address corresponds to the application process and the received request is forwarded to the application process.

6. The method of claim 3 wherein the central processor has a first identifier and the remote processor has a second identifier different from the first identifier.

7. The method of claim 3 wherein the remote and destination processors are off-board processors and the central processor is an on-board processor.

8. The method of claim 1 wherein the communication between the central processor and the remote processor is through a socket layer.

9. The method of claim 1 wherein the identified status further comprises one of a connected status, a disconnected status and a registered status.

10. An application process to process communication system comprising:
    an intranode processor;
    a first internode processor in communication with the intranode processor; and
    a second internode processor in communication with the intranode processor and the first internode processor only through the intranode processor;
    wherein the intranode processor includes a central handler operating on the intranode processor and a storage media storing a routing table; and
    wherein the first internode processor transmits a process message having a message header including a destination process address utilized by the intranode processor to forward the process message.

11. The system of claim 10 wherein the routing table comprises a plurality of process identifiers.

12. The system of claim 10 wherein the message header further comprises a message size, a source address, a message identifier, and a payload length.

13. The system of claim 10 further comprising a process library comprising a plurality of macros facilitating communication between the intranode and internodes.

14. The system of claim 13 wherein the process library is stored in the storage media.

15. The system of claim 13 wherein the first internode processor and the second intranode processor communicate to the intranode processor through a socket layer.

16. An application process to process communication system comprising:

an intranode processor having a plurality of application processes operating on the intranode processor; and an internode processor in communication with the intranode processor, where a plurality of application processes operate on the internode processor;

wherein the intranode processor maintains a routing table including records of each application process that communicates with the intranode processor; and wherein the intranode and internode processors communicate through a socket layer.

* * * * *